United States Patent [19]

Selvidge et al.

[11] 4,110,398

[45] Aug. 29, 1978

[54] METAL SEPARATION FROM DRAGSTREAM MATERIAL OF REFINING PROCESS

[75] Inventors: Charles W. Selvidge, Westmont; Kenneth A. Morgan, Hoffman Estates; Robert R. Frame, Glenview, all of Ill.

[73] Assignee: UOP Inc., Des Plaines, Ill.

[21] Appl. No.: 785,900

[22] Filed: Apr. 8, 1977

[51] Int. Cl.² .................. C01G 31/00; C01G 49/00; C01G 53/00

[52] U.S. Cl. ............................... 423/62; 423/64; 423/68; 423/138; 208/251 R

[58] Field of Search .............. 423/1, 658.5, 62, 64, 423/138; 208/251 R

[56] References Cited

U.S. PATENT DOCUMENTS

| | | | |
|---|---|---|---|
| 1,563,061 | 11/1925 | Baldeschuialer | 423/64 |
| 1,570,170 | 1/1926 | Oherle | 423/64 |
| 1,638,057 | 8/1927 | Oherle | 423/64 |
| 2,372,109 | 3/1945 | Noel | 423/64 |
| 2,383,972 | 9/1945 | Jones | 423/64 |
| 2,800,433 | 7/1957 | Read | 208/45 X |
| 2,920,936 | 1/1960 | Dille et al. | 423/64 |
| 2,966,454 | 12/1960 | Corbett | 208/45 X |
| 3,278,415 | 10/1966 | Doberenz et al. | 208/45 |
| 3,373,101 | 3/1968 | Folkins et al. | 208/45 |
| 3,384,448 | 5/1968 | Mason et al. | 423/64 |
| 3,796,653 | 3/1974 | Gatsis | 208/95 |

FOREIGN PATENT DOCUMENTS 752,773  2/1967  Canada ................................. 423/62

*Primary Examiner*—Herbert T. Carter
*Attorney, Agent, or Firm*—James R. Hoatson, Jr.; Raymond H. Nelson; William H. Page, II

[57] ABSTRACT

A process for the separation of a low metals content organic material from an easily calcinable solid material, effected by treating a low-melting solid material, resulting from the refining of a hydrocarbon crude oil, with naphtha at an elevated temperature and pressure whereby the resulting solid material, after separation of the liquid organic material, is in condition to be readily calcinable.

8 Claims, No Drawings

METAL SEPARATION FROM DRAGSTREAM MATERIAL OF REFINING PROCESS

BACKGROUND OF THE INVENTION

Many petroleum crude oils and other hydrocarbon fractions and/or distillates such as atmospheric tower bottoms products, vacuum tower bottoms products, heavy cycle stocks, crude oil residuum, topped crude oils, oils from sand tars, etc., which may be commonly referred to in the petroleum refining art as "black oils" contain high molecular weight sulfurous compounds in relatively large quantities as well metallic excessive amounts of nitrogenous compounds and high molecular weight organometallic complexes particularly nickel and vanadium must be subjected to a refining process to remove the aforesaid contaminants. The more common of the metallic contaminants comprises nickel and vanadium which are often present in the crude oil in concentrations in excess of 50 ppm, although other metals including iron, copper, etc., may also be present. These metals may exist within the hydrocarbon distillate or crude oil in a variety of forms; for example, they may exist as metal oxides or as sulfides, introduced therein as a form of metalic scale. In addition, they may also be present in the form of soluble salts of such matters; usually, however, they are present in the form of high molecular weight organometallic compounds including metal porphyrins and the various derivatives thereof. Although metallic contaminants which exist as oxide or sulfide scale may be removed, at least in part, by a relatively simple filtering technique while the water soluble salts are at least in part removable by washing and a subsequent dehydration procedure, a much more severe treatment is required to effect the destructive removal of the organometallic compounds, particularly to the degree which is necessary to produce a heavy hydrocarbon fraction which is suitable for further processing.

The refining, and particularly hydrorefining, of the charge stock which comprises crude oils or other sources of the type hereinbefore set forth, may be effected in either a catalytic or non-catalytic manner. It is therefore important that the metal contaminants which are present be removed prior to a further processing of the charge stock. For example, when treating the feed stock to further processing after the hydrorefining process has been effected, it is necessary, in order to avoid decomposition of the catalyst which is employed in these further processes, that the metal contaminants be effectively removed from the charge stock. For example, when a hydrocarbon charge stock containing metals in excess of about 3 ppm is subjected to a cracking process for the purpose of producing lower boiling liquid hydrocarbon products, the metals become deposited upon the catalyst which is utilized, steadily increasing the quantity until such time as the composition of the catalyst composite is changed to the extent that undesirable results are obtained. That is to say, the composition of the cracking catalyst is closely controlled with respect to the nature of the charge stock being processed and to the desired product quality and quantity. Such composiion is changed drastically as a result of the deposition of the metallic contaminants thereupon, the changed composite inherently resulting in changed catalytic characteristics. This effect is undesirable inasmuch as the deposition of the catalytic contaminants on the catalyst composite results in a lesser quantity of normally liquid hydrocarbon products and, in addition, produces large quantities of hydrogen and coke, the latter also producing relatively rapid catalyst deactivation.

When crude feed stock is subjected to refining and particularly hydrorefining processes the bottoms which result from the process comprise a dragstream which is normally solid at room temperature and pressure and which will contain a relatively high contaminant metal content. This relatively high-metals contaminant content which, as hereinbefore set forth, predominantly comprises nickel and vanadium and may, in a subsequent operation, be directly calcined to a high vanadium ore. This high vanadium ore is a valuable precursor to the obtention of vanadium values. However, the dragstream material, because of a high organics level as well as a high metal content cannot be directly calcined inasmuch as the aforesaid high level of organic material causes the material to creep when treated in an oven and becomes a flowing plastic mass.

As will hereinafter be shown in greater detail, it has now been discovered that by treating the dragstream material with naphtha, it is possible to obtain a solid material which is high in metal content and which may be easily calcined to provide the necessary source for the desired vanadium values.

This invention relates to an improvement in a process for the separation of liquid organic material from solid metal containing material. More specifically the invention is concerned with a process for obtaining a solid material which is high in metal values and which is readily subjected to calcination without the undesired characteristics of creeping or turning into a flowing mass during the calcination process.

It is therefore an object of this invention to provide a process for obtaining readily calcinable solid material.

A further object of this invention is found in a process for treating dragstream material from a refining process whereby the resultant solid material may be subjected to a calcination step without attaching undesirable characteristics to the calcination step.

In one aspect an embodiment of this invention is found in a process for the separation of a low metals content organic material from a readily calcinable solid material which comprises subjecting a dragstream resulting from the refining of a high metals containing crude feed stock to treatment with naphtha at an elevated temperature and pressure, thereafter separating the liquid from the solid, and recovering the latter.

A specific embodiment of this invention is found in a process for the separation of a low metals content organic material from a readily calcinable solid material which comprises subjecting a dragstream resulting from a refining process to treatment with naphtha at a temperature in the range of from about 100° to about 250° C. and a pressure in the range of from about 1 to about 50 atmospheres, said solid material being present in a range of from about 5% to about 20% by weight of said naphtha, thereafter separating the solid from the liquid and recovering the latter.

Other objects and embodiments will be found in the following further detailed description of the present invention.

As hereinbefore set forth the present invention is concerned with a process for obtaining a readily calcinable solid material from the dragstream which results from the refining of a crude oil feed stock which is high in metal contaminant content. Examples of refining processes which may be effected to remove the high metal contaminant content of crude oil feed stocks are set forth in U.S. Pat. Nos. 3,303,126 which discloses a non-catalytic hydrorefining process or 3,796,653 which describes a non-catalytic hydrorefining process followed by a solvent extraction of the product effluent. In both instances, the insoluble portions resulting from the process will contain a relatively large amount of metals such as nickel and vanadium as well as lesser amounts of iron, copper, etc. However, as hereinbefore set forth, these bottom products which are solid material at room temperature and pressure cannot be directly calcined to form a high vanadium content ore. Therefore, an intermediate step must be effected in order to provide a readily calcinable solid material which will not creep during the calcination period. It has now been discovered that such a type of material may be obtained by treating the dragstream material with naphtha at elevated temperatures and pressures for a predetermined period of time whereby any organic material which is present in the dragstream is removed thereby leaving a solid material which may be calcined under relatively mild conditions without the material becoming a plastic mass. The naphtha which may be utilized consists of a relatively narrow boiling range fraction of petroleum and may, if so desired, comprise a fraction resulting from the refining process which produces the dragstream which is to undergo treatment. The dragstream is contacted with the naphtha at temperatures ranging from about 100° to about 250° C. in an appropriate apparatus at relatively low pressures ranging from 1 to about 50 atmospheres. The mixture of naphtha and dragstream is agitated at the predetermined conditions of temperature and pressure for a period of time which may range from about 0.5 up to about 10 hours or more in duration, following which heating is discontinued and the mixture allowed to return to room temperature. In the event that the reaction is effected in a suitable pressure apparatus such as an autoclave of the rotating or mixing type, the excess pressure, after the apparatus has returned to room temperature, is discharged and the reaction mixture is recovered therefrom. The solid mass is separated from the organic liquid which is low in minerals by conventional means such as filtration, decantation, etc. Thereafter the solid material which is relatively high in metal content is then calcined to provide a vanadium bearing source which itself may then be subjected to conventional means of metal recovery.

It is also contemplated within the scope of this invention that the treatment of the dragstream material with naphtha may also be effected in the presence of water. By utilizing this added component in the reaction mixture it will facilitate the removal of the solid material which is rich in metal values. The reaction mixture after cessation of the agitation will form an interface between the water and the naphtha with the solid material sinking to the bottom of the water phase. Therefore, when utilizing a continuous process in which the dragstream is continuously charged to an appropriate apparatus along with a continuous charge of water and naphtha followed by agitation of the mixture for a predetermined period of time and withdrawal of the mixture to a settling tank, it is possible to further withdraw the extracted product as a water slurry while the organic phase is also continuously withdrawn through separate lines.

The amount of naphtha and amount of water which are utilized will be within a relatively wide range of volume ratios. For example, the amount of naphtha which is utilized to effect the treatment of the dragstream will be of such an amount so that the solids are present in the reaction mixture in a range of from about 5% to about 20% by weight of the naphtha while, if so desired, any water which is utilized in the treatment process will be present in a range of from about 10% to about 40% by weight of the naphtha.

By utilizing naphtha which may, if so desired, be taken from the refining process, it is possible to effect the treatment of the dragstream material in a much more economical manner. It is possible to utilize other organic solvents such as benzene, toluene, the xylenes, n-pentane, n-hexane, etc. However, these hydrocarbons are expensive and in large scale treatment it would require an added step and added equipment in order to recover the organic material for reuse. Thus, by utilizing naphtha which is relatively inexpensive, it is possible to employ the naphtha as a solvent in a one-step process, without recovery of the naphtha for further use, said naphtha, if so desired, being burned as a relatively low metals fuel.

The thus treated dragstream material which is recovered in a readily calcinable form may then be subjected to further process steps in order to recover the vanadium therefrom. For example, the dragstream material may be calcined at elevated temperatures ranging from about 300° to about 900° C. or more for periods of time running from about 1 to about 10 hours or more. Thereafter the thus calcined material may then be subjected to a leaching step in which said leaching is effected at temperatures ranging from ambient to about 250° C. and, if so desired, elevated pressures up to about 500 psi. The leach is effected by treating the material with an alkali metal or alkaline earth metal solution such as sodium hydroxide, lithium hydroxide, sodium carbonate, potassium carbonate, calcium hydroxide, magnesium hydroxide, etc. At the conclusion of the leaching step of the operation which may take place during a period of from about 0.5 to about 10 hours or more in duration, the solution is passed to a separation zone wherein tail materials are separated from the pregnant leach liquor. The pregnant leach liquor is then contacted with an ammonium-containing compound such as gaseous ammonia, ammonium hydroxide, etc., to form ammonium metavanadate. The formation of the ammonium metavanadate is accomplished at temperatures ranging from about 0° to about 80° C. at a temperature just above room temperature, i.e., about 25° to about 35° C. Following completion of the formation of the solid vanadium salts, they are separated from the mother liquor by conventional means and passed to a drying tank wherein the water is removed while the dried product is passed to a calciner. The solid vanadium salts are calcined at temperatures ranging from about 200° to about 600° C. and recovered. After calcination the solid vanadium pentoxide is withdrawn from the calciner, washed with water and passed to another separation zone wherein additional alkali metal vanadates may be recovered. Thereafter the solid vanadium values which are formed of vanadium oxides such as vanadium trioxide, vanadium tetraoxide, vanadium pentoxide, etc., are withdrawn, passed to a drying tank, and after being dried are recovered. It is to be understood that this description of the recovery of vanadium values is only given for purposes of illustration, and that any other method for the recovery of said vanadium may be utilized.

The following examples are given to illustrate the process of the present invention. However, it is to be understood that these examples are general in nature and, in view of the fact that they are presented only as a means of illustrating this invention, are not intended to limit the generally broad scope of the present invention in strict accordance therewith.

EXAMPLE I

A solution consisting of 25 grams of a dragstream resulting from the hydrorefining of a heavy crude oil feed stock along with 150 cc of naphtha and 50 cc of water were treated in a rotating autoclave at a temperature of 150° C. for a period of 3 hours. The dragstream material which was utilized contained 10% sulfur, 64.3% carbon, 5.5% hydrogen, 8.3% vanadium, 0.12% iron and 0.47% nickel. At the end of the 3-hour period, heating was discontinued and the agitation of the mixture was also discontinued. A dark essentially solid mass settled to the bottom of the vessel and was separated from the black oil liquid by decantation. Removal of the bulk of the naphtha by distillation produced a black oil which amounted to 7.3 grams and contained 80.3% carbon, 8.93% hydrogen, 1.1% vanadium, 0.023% iron and 0.058% nickel. The dried black solid material which comprised 17.7 grams contained 9.69% sulfur, 60.27% carbon, 4.84% hydrogen, 10.9% vanadium, 0.15% iron and 0.27% nickel. In addition, the solid was readily calcinable when treated at calcination temperatures of 300° C. for a period of 1 hour in an open dish, no creep or formation of a plastic mass being observed.

EXAMPLE II

In a manner similar to that set forth in Example I above, 13 grams of the dragstream material was treated with 175 cc of naphtha and 25 cc of water for a period of 3 hours at 150° C. with constant agitation. At the end of the 3-hour period, heating and agitation were discontinued and after the black solid mass had settled the black liquid was removed by decantation. Removal of the bulk of the naphtha via distillation yielded 4.9 grams of a viscous black liquid, analysis of which disclosed the presence of 2.1% vandium, 0.035% iron and 0.095% nickel. After drying, the black solid mass weighed 8.2 grams, analysis of which disclosed the presence of 12.6% vanadium, 0.18% iron, and 0.32% nickel.

It is therefore apparent that the naphtha fraction which is recovered from the treatment is relatively low in metal content and may be utilized as a low metal fuel while the solid dragstream material is relatively high in metal content and is easily calcinable at 300° C. in an open dish.

In contradistinction to this, a dragstream material which was not treated with the naphtha and water solution formed a plastic mass which cooled to a black solid when treated at 300° C. for 1 hour in an open dish.

EXAMPLE III

To illustrate the fact that the process of this invention may be effected utilizing only naphtha without any added water, 13 grams of the dragstream material from Example I was treated with 175 cc of naphtha for a period of 3 hours at 150 cc, the solution being maintained in a state of constant agitation. At the end of this 3-hour period, heating and agitation were discontinued. Following the settling of the black solid, the black liquid was removed by decantation. Thereafter the bulk of the naphtha was removed by distillation to yield 50 grams of a viscous black liquid. Analysis of this liquid disclosed the presence of 0.35% vanadium, 0.07% nickel and less than 0.01% iron. After drying, the black solid which weighed 9.2 grams was also analyzed, the solid containing 12.4% vanadium, 0.2% iron and 0.42% nickel.

As in the above examples, it has been shown that the naphtha fraction as evidenced by the black liquid was relatively low in metal content while the solid material contains a relatively high metal content and is also easily calcinable at 300° C.

We claim as our invention:

1. A process which comprises agitating a dragstream resulting from the refining of a crude feed stock containing vanadium and nickel with naphtha at a temperature of from about 100° to about 250° C., a pressure of from about 1 to about 50 atmospheres, and a time period of from about 0.5 to about 10 hours, the solids content of the dragstream being present in a range of from about 5% to about 20% by weight of said naphtha, separating liquid from solid, calcining the latter at a temperature of from about 300° to about 900° C. for a time period of at least about 1 hour, and recovering the calcined solid material containing vanadium and nickel.

2. The process as set forth in claim 1 in which said feed stock and said calcined solid material additionally contain iron.

3. The process as set forth in claim 1 in which said agitation of said dragstream with naphtha is effected in the presence of water.

4. The process as set forth in claim 3 in which said water is present in a range of from about 10% to about 40% by weight of said naphtha.

5. The process as set forth in claim 1 in which said feed stock is tower bottom products.

6. The process as set forth in claim 1 in which said feed stock is crude oil residuum.

7. The process as set forth in claim 1 in which said feed stock is topped crude oil.

8. The process as set forth in claim 1 in which said refining of said feed stock is a hydrorefining process.

* * * * *